United States Patent Office 3,651,149
Patented Mar. 21, 1972

3,651,149
β-(6-METHOXY-2-NAPHTHYL)-9-BORABICYCLO-
(3,3,1)-NONANE
Ian T. Harrison, Palo Alto, Calif., assignor to
Syntex Corporation, Panama, Panama
No Drawing. Filed Sept. 30, 1969, Ser. No. 862,458
Int. Cl. C07c 5/02; C07f 43/20
U.S. Cl. 260—606.5 B                                         1 Claim

ABSTRACT OF THE DISCLOSURE

This invention relates to β-(6-methoxy-2-naphthyl)-9-borabicyclo(3,3,1)-nonane which is useful in the preparation of 2-(6-methoxy-2-naphthyl)propionic acid. The said propionic acid has anti-inflammatory, analgesic and antipyretic activities.

---

This invention relates to a process for preparing 2-(6-methoxy-2-naphthyl)propionic acid and an intermediate therefor.

In general, the process of this invention for preparing 2-(6-methoxy-2-naphthyl)propionic acid comprises the steps of reacting β-(6-methoxy-2-naphthyl)-9-borabicyclo((3,3,1))nonane with a lower alkyl 2-bromopropionate or a lower alkyl 2-iodopropionate in an ether solvent containing from 0 to 75 volume percent of a tertiary lower alkanol in the presence of from 2 to 5 molar equivalents of an alkali metal t-alkoxide at a temperature of −10° C. to 20° C. until a lower alkyl 2-(6-methoxy-2-naphthyl)propionate is formed; hydrolyzing the ester group of the 2-(6-methoxy-2-naphthyl)propionate; and recovering 2-(6-methoxy-2-naphthyl)propionic acid from the reaction mixture. Preferably the product is resolved to yield d 2-(6-methoxy-2-naphthyl)propionic acid.

The process of this invention can be represented by the following formulas:

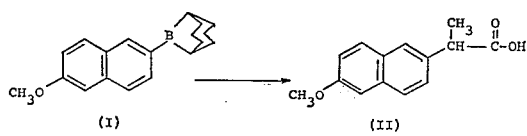

The term "lower alkyl" includes primary, secondary and tertiary alkyl groups of straight and branched chain configuration having up to 6 carbons. Examples are methyl, ethyl, propyl, isopropyl, n-butyl, i-butyl, t-butyl, n-pentyl, n-hexyl and the like.

The compound of Formula II is prepared by reacting the compound of Formula I, that is β-(6-methoxy-2-naphthyl)-9-borabicyclo((3,3,1))nonane, with at least one and preferably from 1 to 2 molar equivalents of a lower alkyl 2-bromopropionate or a lower alkyl 2-iodopropionate in a suitable solvent in the presence of an alkali metal t-alkoxide.

Suitable solvents for this reaction include conventional ethers such as diethyl ether, tetrahydrofuran, tetrahydropyran, dimethoxyethane and the like containing from 0 to 75 and preferably from 40 to 60 volume percent of a tertiary lower alkanol such as t-butanol, t-pentanol, 3-methyl-3-pentanol, 2-methyl-2-pentanol and the like.

The reaction mixture should contain at least 2 and preferably from 2 to 5 molar equivalents of an alkali metal t-alkoxide, preferably a lower t-alkoxide. Suitable alkali metal t-alkoxides include potassium t-butoxide (preferred), potassium t-pentoxide, potassium 3-methyl-3-pentoxide, potassium 3-methyl-3-pentoxide, and the corresponding sodium and lithium compounds.

The reaction can be carried out at a temperature of from −10° C. to 20° C., temperatures of from 0 to 20° C. being preferred. The time required for the reaction depends upon the reaction temperature, times of from 2 hours to 2 days usually being sufficient.

The 2-(6-methoxy-2-naphthyl)propionate is then hydrolyzed to form the compound of Formula II. The reaction product can be hydrolyzed to form the free acid by treatment with base followed by acidification or by treatment with a strong acid. For basic hydrolysis a solution of a strong base such as sodium or potassium hydroxide in a suitable solvent such as water is mixed with the reaction mixture, and the reaction mixture is maintained at a temperature of from 25° C. to reflux temperature until hydrolysis occurs. Usually from 10 minutes to 6 hours is sufficient for this hydrolysis. The reaction mixture is then acidified with an acid such as acetic acid, trifluoroacetic acid, p-toluenesulfonic acid, hydrochloric acid, sulfuric acid, hydroiodic acid, hydrobromic acid, phosphoric acid and the like to release the free acid.

Alternatively, the reaction mixture is mixed with a solution of a strong organic or inorganic acid such as trifluoroacetic acid, p-toluenesulfonic acid, methanesulfonic acid, hydrochloric acid, hydrobromic acid, hydroiodic acid, sulfuric acid, phosphoric acid and the like at a temperature of at least 60° C. and preferably from 90° C. to the boiling point of the mixture until the hydroylsis occurs. Usually from 5 to 24 hours is sufficient. Suitable solvents include water, acetic acid, aqueous alcohols and the like. If the acid hydrolysis is used, the free acid is formed directly. If necessary, the reaction mixture can be diluted with water to precipitate the product.

The product compound of Formula II is then separated from the reaction mixture by conventional procedures. For example, the reaction mixture can be extracted with ether or a similar solvent, the ether phase washed with water, dried and evaporated and the residue recrystallized from acetone-hexane. Alternatively, the reaction mixture can be diluted with water, thereby precipitating the compound of Formula II which can be removed by filtration and crystallized from acetone-hexane. Chromatography can also be used to purify and/or isolate the product compound of Formula II.

The preferred product is d 2-(6-methoxy-2-naphthyl) propionic acid. To obtain this product, optical resolution of the compound of Formula II can be achieved by selective biological degradation or by preparation of diastereo isomer salts of the 2 - (6 - methoxy-2-naphthyl) propionic acid with a resolved optically active amine base such as cinchonidine and then separating the thus formed diastereo isomer salts by fractional crystallization. The separated diastereo isomer salts are then acid cleaved to yield the respective d 2-(6-methoxy-2-naphthyl)propionic acid.

The compound of Formula I can be prepared by a procedure represented by the following formulas:

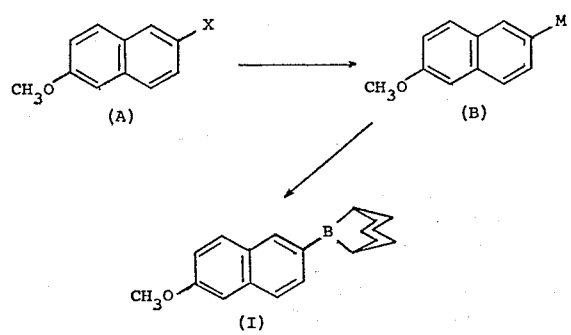

In the above formulas, X is bromo, chloro or iodo and M is Li or MgX.

The compounds of Formula A are all known compounds. The compounds of Formula B wherein M is lithium are prepared by reacting the compounds of Formula A with lithium metal in an ether solvent such as tetrahydrofuran, diethyl ether, tetrahydropyran and the like at a temperature of from 0 to 65° C. for from 0.5 to 2 hours. The compounds of Formula B wherein M is a magnesium halide are prepared by reacting the compounds of Formula A with magnesium in an ether solvent such as described above at a temperature of from 0 to 65° C., for from ½ to 2 hours.

The compound of Formula I is prepared by reacting the compounds of Formula B with 9-borabicyclo((3,3,1))nonane in an ether solvent such as diethyl ether, tetrahydrofuran, tetrahydropyran and the like at a temperature of from −10° C. to 20° C. for from 0.5 to 2 hours. Then the reaction mixture is acidified with any nonaqueous organic or inorganic acid which will not degrade the other portions of the molecules. Suitable organic and inorganic acids include formic acid, acetic acid, propionic acid, trifluoroacetic acid, p-toluenesulfonic acid, methanesulfonic acid, hydrochloric acid, hydrobromic acid, hydroiodic acid, sulfuric acid, phosphoric acid and the like. One equivalent of the acid is added to the reaction mixture. Following the acidification, the reaction mixture is maintained at a temperature of from 0 to 30° C. for from 0.5 to 5 hours to yield the compound of Formula I.

The compound of Formula II exhibits anti-inflammatory, analgesic and anti-pyretic activities and is accordingly employed in the treatment of inflammation, pain and pyrexia in mammals. For example, inflammatory conditions of the muscular skeletal system, skeletal joints and other tissues can be treated. Accordingly, this compound is useful in the treatment of conditions characterized by inflammation such as rheumatism, concussion, laceration, arthritis, bone fractures, post-traumatic conditions and gout.

This invention ns further illustrated by the following specific but non-limiting examples.

EXAMPLE 1

A solution of 23 g. of 2-bromo-6-methoxynaphthalene in 100 ml. of tetrahydrofuran is slowly added to 1.4 g. of lithium metal in 100 ml. of tetrahydrofuran to yield 6-methoxy-2-naphthyl lithium.

EXAMPLE 2

A solution of 24 g. of 2-bromo-6-methoxynaphthalene in 300 ml. of tetrahydrofuran is slowly added to 2.5 g. of magnesium turnings in 100 ml. of tetrahydrofuran at reflux temperature to yield 6-methoxy-2-naphthyl magnesium bromide.

EXAMPLE 3

A solution of 16 g. of 6-methoxy-2-naphthyl lithium in 250 ml. of ether is added to 12 g. of 9-borabicyclo((3,3,1))nonane in 100 ml. of tetrahydrofuran at 0° C. After one hour at this temperature, the mixture is treated with 9.5 g. of methanesulfonic acid (1 equivalent) and stirred for an additional 1 hour to yield B-(6-methoxy-2-naphthyl) - 9-borabicyclo((3,3,1))nonane which can be isolated by chromatography if desired. However, separation is not necessary.

A solution of 18 g. of ethyl bromopropionate in 50 ml. of diethyl ether and 25 g. of potassium t-butoxide suspended in 100 ml. of t-butanol is then added, and the mixture is maintained at 10° C. for 24 hours. The mixture is then acidified with 500 ml. of 6 N hydrochloric acid, and the mixture is heated under reflux for 6 hours. The reaction mixture is then extracted with ether. The ether phase is washed with water, dried, and evaporated, and the residue is recrystallized from acetone-hexane to yield 2-(6-methoxy-2-naphthyl)propionic acid.

EXAMPLE 4

Repeating the procedure of Example 3 but replacing ethyl 2 - bromopropionate with ethyl 2 - iodopropionate yields 2-(6-methoxy-2-naphthyl)propionic acid.

EXAMPLE 5

A solution of dl 2-(6-methoxy-2-naphthyl)propionic acid in methanol is prepared by dissolving 230 g. of the product of Example 3 in 4.6 l. of warm methanol. The resulting solution is boiled until it becomes turbid; then sufficient methanol is added to make the solution clear again. This hot solution is added to a solution of 296 g. of cinchonidine in 7.4 l. of methanol heated to about 60° C. The solutions are combined while stirring, and the combined mixture is then allowed to reach room temperature over a 2 hour period. After the reaction mixture has reached room temperature, it is stirred for an additional 2 hours and then filtered. The filtered solids are washed with several portions of cold methanol and dried.

100 grams of cinchonidine salt crystals are added to a stirred mixture of 600 ml. of ethyl acetate and 450 ml. of a 2 N aqueous hydrochloric acid. After the mixture has been stirred for 2 hours, the ethyl acetates layer is removed and washed with water to neutrality, dried over sodium sulfate and evaporated to yield d 2-(6-methoxy-2-naphthyl)propionic acid.

I claim:
1. β - (6 - methoxy-2-naphthyl)-9-borabicyclo(3,3,1)) nonane.

References Cited
UNITED STATES PATENTS 3,090,801    5/1963    Washburn et al. __ 260—606.5 B TOBIAS E. LEVOW, Primary Examiner W. F. W. BELLAMY, Assistant Examiner U.S. Cl. X.R.

260—520